United States Patent [19]

Tonoli

[11] Patent Number: 4,628,906
[45] Date of Patent: Dec. 16, 1986

[54] METHOD AND INSTALLATION FOR RAISING THE WATER TEMPERATURE IN INLAND BASINS

[76] Inventor: Leonardo Tonoli, Via Del Monte 14, Salo' (Brescia) 25087, Italy

[21] Appl. No.: 679,756

[22] Filed: Dec. 10, 1984

[30] Foreign Application Priority Data

Oct. 24, 1984 [IT] Italy .................................. 5220 A/84

[51] Int. Cl.⁴ ............................. F24J 2/00; F24J 2/42
[52] U.S. Cl. .................................. 126/452; 126/415; 126/430; 126/436; 165/45
[58] Field of Search ............... 126/415, 432, 436, 430, 126/452; 165/1, 45, 128, 132

[56] References Cited

U.S. PATENT DOCUMENTS 3,436,908  4/1969  Delic ................................... 126/432
4,498,454  2/1985  Assaf .................................. 165/45 X Primary Examiner—Larry Jones
Attorney, Agent, or Firm—McGlew and Tuttle

[57] ABSTRACT

The present invention is directed to a method for increasing the thermic content and, therefore, the water temperature in inland open water basins which have, therefore, an outlet or drain. The system provides for drawing off and conveying the cold water of the deeper layers of the basin toward the outlet or drain, while concurrently retaining within the basin the warmer water of the upper or superficial layers. The system may be carried out and implemented by means of fixed structures comprising at least one outflow conduit with one terminal within the basin's deepest water layers, through one or more intakes, and with the other terminal exiting into the drain, the structure further comprising one or more barriers positioned in the vicinity of the outlet or drain in order to retain within the basin the superficial layers of warm water.

7 Claims, 2 Drawing Figures

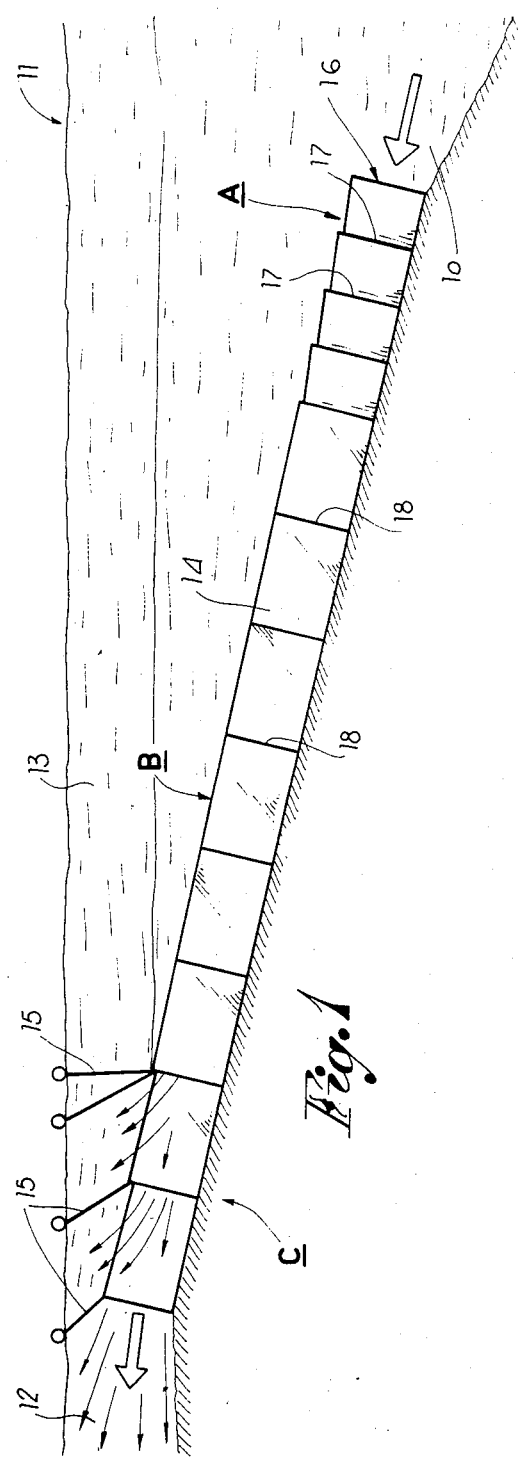
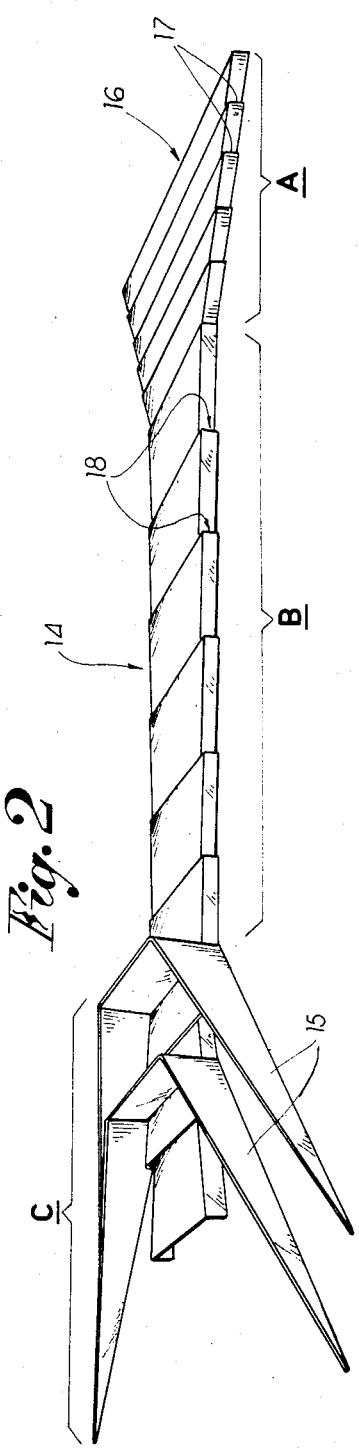

METHOD AND INSTALLATION FOR RAISING THE WATER TEMPERATURE IN INLAND BASINS

DESCRIPTION OF THE INVENTION

The present invention relates to a system and to an installation for raising the thermic content and, therefore, the water temperature of the inland water basins, such as, for instance, lakes with at least one outlet or drain.

In order to face the increasing demands for energy and to better exploit the available energy, several proposals were submitted during the last few years to solve the problem by dealing with the most varied sources of energy.

The basic concept on which the present invention resides provides for the accumulation of thermic energy within the open water basins or lakes, having at least one outlet or drain, by means of the control of the thermic flow exiting from such basins or lakes.

Generally, any lake gives up to its outlet or drain the most superficial layers of water, which are always the warmest ones.

Consequently, in every lake or basin there remains the coldest water layers, in the deep reagions of the water body, so that the temperature of the basin is maintained at a lower temperature than would be the case if the warmer, superficial layers of water were retained, because the superficial strata are heated by solar energy, but are lost to the outlet or drain from the basin.

Starting from such premise, it is an object of the present invention to provide for a system and an installation which permit, by means of precise procedures, to retain within the basins or lakes the superficial waters and to facilitate the expulsion the deeper and colder water layers, at leats those below the thermic jump layer, so as to increase progressively the thermic content and, therefore, the temperature of the basin.

It is another object of the invention to provide for a fixed installation for raising the temperature of open water inland basins or lakes, with a minimal expense in the materials employed, the greatest simplicity of shape and structure and of actions and reactions a minimal cost of installation and operation, keeping to a minimum the local navigational incoveniences, and maximization of the overall efficiency of the objects to be achieved.

The application of the present invention is most suitable for terminal lakes, that is, lakes which have been created by the glacial excavation of the rock in situ, and these formed by morainic barriers.

The principal reasons for the above greatest suitability are:

(1) these lakes have the most populated shores, geographically, of any other zone, the population density being motivated by the temperate climate, a constant and varied agriculture, and large communication routes. They, therefore, possess local means of utilization of energy;

(2) these lakes receive mostly cold waters, from glaciers and/or snowfields, which considerably lower the temperature of the hydric masses;

(3) these lakes are, generally, located at latitudes that have a winter season which is relatively rigid.

It is exactly for these reasons that the application of the invention would favor the tendency to an increase in the mitigating effect of the lake during the winter seasons, through a greater distribution of the accumulated thermic energy over that period of time. Jointedly, the climate would go from temperate-cool to temperate-mild.

With the present installation in operation, there will be a water flow volumetrically equal to the normal existing one, but with a thermic difference of considerable importance, the magnitude of which is given by the thermic difference between the superficial waters, which remain within the basin, and those which exit through the system in question.

There will be also obtained a division, even at lower levels, of the thermic accumulation of the first layers, due to solar heating. Such a vertical division of the heated waters will permit the increase the thermic supply which will thus be exploited in the atmospheric heating during those months, when the air is cooler or colder. The transfer of heat from the water to the air will become more consistent and will be effected at temperatures which in the average will be more elevated.

These conditions will then favor an increase in the zones and in the importance of the breezes, so that there will be a tendency to have a diminution in stagnant air masses. As a consequence, there will be a greater solar irradiation, directly applied to the water also during the colder periods of the year, reducing the loss in thermic content of the water during such periods, with all the other climactic and material benefits deriving therefrom.

Greater details of the invention will become evident from the following description thereof, given for examplary purposes with reference to the accompanying drawings, in which:

FIG. 1 is a longitudinal, schematic view of the installation of the present invention; and FIG. 2 is a perspective view of the effluent conduit of the waters of the basin, from the basin to the outlet or drain:

The system according to the invention provides for the removal and conveyance of the cold water 10 of the deeper layers of a water basin 11 toward an outlet or drain 12, retaining concurrently within the basin the warmer water 13 of the superficial layers.

To materialize such a system, the invention provides for an installation which comprises at least one effluent conduit 14 which is immersed within the layers of cold water 10 of the basin, and which exits into the outlet or drain 12, and one or more vertical barriers 15, positioned in the vicinity of the outlet and about the upper mouth of the conduit 14, in order to retain within the basin the layers of warm water 13.

Specifically, the installation comprises substantially three zones A, B and C, beginning from the deepest extremity of the conduit 14 and moving toward the outlet or drain.

The first zone A has the function of removing from the depths of the basin a volume of water corresponding to a predetermined fraction of the volume of the outlet or drain. The second zone B serves to convey the removed volume of water, maintaining an accelerated and laminar flow during the entire section between the first a and the third zone C.

The acceleration is slow, but constant until the third zone C which has the function of receiving the flow from the second zone B and of slowing it down, of retaining the superficial waters and of facilitating the exit of the conveyed flow in the outlet or drain.

Zone A of the conduit rests on the bottom and becomes narrower gradually as it nears zone B. In order to achieve its own task, it must have an opening or mouth 16 of considerable dimension, from which mouth has to pass a large part of the water volume (final water volume). Zone A has also a number of lateral secondary openings 17 for the removal of additional water.

Frictions in the vicinity of the walls limiting the flow may be reduced by introducing in the regions in question of liquid masses, through openings 17, thus permitting the conveyed water masses to separate themselves from the walls and to accelerate proportionately to the abatement of the resistance and to the diminution in the area of the conduit.

The second zone B is a tunnel of uniform cross-section throughout its entire length. This zone rises from the bottom to about the elevation of the outlet or drain's base. Zone B has to maintain substantially unchanged the water flow introduced therein from Zone A, so that it may also be provided with lateral openings 18 for an additional introduction of water for the diminution of the friction forces and of the resistances induced in the system.

The lateral openings, in addition to the decreasing dimensions of the conduit, are very important in the conveyance of the water flow and in the overcoming of the friction forces; furthermore, they offer the possibility of regulating the velocity, the resistance, the turbulence and the temperature of the water mass exiting the conduit, thus avoiding the damaginq effects of possible ramming forces.

The third zone C of the installation is so structured as to decelerate the water flow exiting from the conduit into the outlet and is structurally mating the barriers 15 which serve to retain the superficial layers of water.

The various sections of the conduit 14 may be constructed with suitable materials, inexpensive and light, such as plastic films anchored to the bottom and reinforced with supporting and reinforcing frames. also the barriers may be made with suitable materials, capable of resisting the superficial urging of the water and should be arranged so as to automatically adapt themselves to variations in the water level in the basin.

The barriers 15 of the installation must therefore compensate for the sum total of the friction forces, the turbulence induced, the difference in kinematic viscosity of the water for the different temperature of the dynamic masses.

The number of barriers and their shape and disposition may vary, depending on the conditions of the water basin or lake in question.

Since the barriers rise from the bottom of the basin vertically to the surface, it is convenient that they be consisting of material that is not waterproof, but that it permits a slow and capillary infiltration. The floating portion may have, if so desired, a cylindrical shape, semi-immersed in the water, so that it might carry out the eventually necessary pression and depression created by the barriers.

I claim:

1. A method of increasing the thermic content and temperature of inland basin water in an inland basin having an outlet mouth and a plurality of water layers of different temperature therein above a basin bed thereof, lower water layers being cooler than a top water layer of the basin water and the outlet mouth being at a level above the basin bed for the usual outflow of the top water layer from the inland basin, comprising fixing a conduit to the basin bed which extends from a lower layer of the basin water to the top layer thereof and to the outlet mouth of the inland land basin, the conduit having a lower inlet opening for receiving basin water from the lower layer and an upper outlet opening for discharging basin water into the outlet mouth, fixing a vertical barrier around the conduit outlet and in the outlet mouth for retaining and damming basin water of the top water layer in the inland basin, the vertical barrier having an upper edge which is above the conduit outlet and conveying basin water from the lower layer to the top layer and to the outlet mouth through the conduit when the top layer is above the conduit outlet.

2. A method according to claim 1, wherein the conduit is established on the bed by overlying the bed with a substantially U-shaped duct formation having an inlet at a lower layer and an outlet at an top layer.

3. A method according to claim 2, including providing a plurality of spaced-apart vertical barriers in the outlet mouth of the basin which define a trough therebetween, and forming the conduit of a plurality of U-shaped ducts having inlets therebetween for receiving water from additional lower layers of the basin water.

4. In combination with an inland water basin having an outlet mouth and a plurality of water layers of different temperature therein above a basin bed thereof, lower water layers being cooler than top water layers of the basin water and the outlet mouth being at a level above the basin bed for the usual outflow of the top water layer from the inland basin, an apparatus for increasing the thermic content and temperature of the basin water, comprising a fixed wall having an inverted U-shaped cross-section, anchored to the basin bed and forming a conduit having an inlet opening in one of the lower water levels, said conduit having a discharge at the top water layer and in the basin outlet mouth, at least one vertically extending barrier positioned around said discharge and across said outlet mouth for damming the top water layer to prevent the top water layer flowing out through said outlet mouth, a top edge of said vertical barrier being higher than said discharge of said conduit whereby said colder water from said lower level enters through said inlet opening of said conduit, travels along said conduit and between said conduit and said basin bed, and out through said discharge.

5. The combination of claim 4, wherein said conduit includes a lower zone which narrows from said inlet opening toward said discharge, said conduit including an intermediate zone having a substantially uniform cross-section and extending toward said discharge, and a discharge zone containing said discharge and extending from said vertical barrier to said discharge.

6. A combination according to claim 5, wherein said zones are each made of a plurality of U-shaped sections, said U-shaped sections defining a plurality of inlet openings in said lower zone.

7. A combination according to claim 6, including a second vertical barrier spaced from said at least one vertical barrier and defining a trough therebetween, said conduit including at least one additional discharge discharging into said trough.

* * * * *